(12) United States Patent
Chang et al.

(10) Patent No.: US 9,686,087 B2
(45) Date of Patent: Jun. 20, 2017

(54) SYNCHRONIZATION OF QUESTIONS AND ANSWERS IN A COLLABORATIVE MESSAGING ENVIRONMENT

(75) Inventors: Belinda Y. Chang, Cary, NC (US); Shruti Gandhi, Poughkeepsie, NY (US); Angela Richards Jones, Durham, NC (US); Pamela A. Nesbitt, Tampa, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1108 days.

(21) Appl. No.: 11/934,455

(22) Filed: Nov. 2, 2007

(65) Prior Publication Data

US 2009/0119371 A1    May 7, 2009

(51) Int. Cl.
| | |
|---|---|
| *G06F 15/16* | (2006.01) |
| *G06F 15/173* | (2006.01) |
| *H04L 12/18* | (2006.01) |
| *H04L 12/26* | (2006.01) |
| *H04L 29/08* | (2006.01) |
| *H04L 12/58* | (2006.01) |
| *H04L 29/06* | (2006.01) |

(52) U.S. Cl.
CPC ...... *H04L 12/1827* (2013.01); *H04L 12/1813* (2013.01); *H04L 12/2602* (2013.01); *H04L 12/581* (2013.01); *H04L 12/585* (2013.01); *H04L 51/22* (2013.01); *H04L 51/28* (2013.01); *H04L 51/34* (2013.01); *H04L 67/2842* (2013.01); *H04L 67/2852* (2013.01); *H04L 67/42* (2013.01)

(58) Field of Classification Search
CPC ...... H04L 12/581; H04L 51/04; H04L 12/585; H04L 12/1813; H04L 12/1831; H04L 12/2602; H04L 51/12; H04L 51/22; H04L 51/28; H04L 51/34; H04L 67/02; H04L 67/42; H04L 67/80; H04L 67/2842; H04L 67/2852
USPC ......................................... 709/205–207, 224
See application file for complete search history.

(56) References Cited

U.S. PATENT DOCUMENTS

| | | | |
|---|---|---|---|
| 6,346,952 B1 * | 2/2002 | Shtivelman | 715/758 |
| 6,970,821 B1 * | 11/2005 | Shambaugh et al. | 704/270 |
| 7,263,526 B1 * | 8/2007 | Busey et al. | |
| 7,603,413 B1 * | 10/2009 | Herold et al. | 709/204 |

(Continued)

*Primary Examiner* — Farzana Huq
(74) *Attorney, Agent, or Firm* — Cuenot, Forsythe & Kim, LLC

(57) ABSTRACT

Embodiments of the present invention address deficiencies of the art in respect to question and answer management in a collaborative environment, and provide a novel and non-obvious method, system and apparatus for synchronizing questions and answers in an instant messaging session. In one embodiment of the invention, a method of synchronizing questions and answers in an instant messaging session can be provided. The method can include maintaining an instant messaging session between first and second participants, identifying questions and answers in the instant messaging text, matching each of the answers to a corresponding one of the questions, and displaying the matched questions and answers supplementally to the displaying of the chat transcript, ensuring that a participant does not overlook a question where response on their part is required.

15 Claims, 2 Drawing Sheets

(56) References Cited

U.S. PATENT DOCUMENTS

| | | | |
|---|---|---|---|
| 2002/0059164 A1* | 5/2002 | Shtivelman | 707/1 |
| 2004/0083127 A1* | 4/2004 | Lunsford et al. | 705/10 |
| 2006/0031361 A1* | 2/2006 | Bailey | G06F 3/0481 709/206 |
| 2006/0080130 A1* | 4/2006 | Choksi | 705/1 |
| 2006/0136474 A1* | 6/2006 | Chang | G06F 17/30654 |
| 2006/0161666 A1* | 7/2006 | Cohen et al. | 709/229 |
| 2006/0206566 A1* | 9/2006 | Kelley | G06Q 10/107 709/205 |
| 2007/0005701 A1* | 1/2007 | Barsness et al. | 709/205 |
| 2007/0156832 A1* | 7/2007 | Daniels-Farrar et al. | 709/207 |
| 2007/0195779 A1* | 8/2007 | Judge et al. | 370/392 |
| 2007/0198645 A1* | 8/2007 | Chen | H04L 12/1822 709/207 |
| 2007/0203985 A1* | 8/2007 | Abernethy | G06Q 10/107 709/206 |
| 2007/0219794 A1* | 9/2007 | Park et al. | 704/246 |
| 2007/0255791 A1* | 11/2007 | Bodlaender et al. | 709/206 |
| 2007/0288576 A1* | 12/2007 | Illg | G06Q 10/107 709/206 |
| 2008/0133671 A1* | 6/2008 | Kalaboukis | 709/206 |
| 2008/0144784 A1* | 6/2008 | Limberg | 379/88.14 |
| 2008/0147804 A1* | 6/2008 | Gyure et al. | 709/206 |
| 2008/0177717 A1* | 7/2008 | Kumar | G06F 17/3064 |
| 2008/0189623 A1* | 8/2008 | Patil | H04L 12/1827 715/753 |
| 2008/0195378 A1* | 8/2008 | Nakazawa et al. | 704/9 |
| 2008/0215541 A1* | 9/2008 | Li et al. | 707/3 |
| 2008/0263157 A1* | 10/2008 | Bhogal et al. | 709/206 |
| 2008/0270541 A1* | 10/2008 | Keener et al. | 709/206 |
| 2009/0021790 A1* | 1/2009 | Krovitz et al. | 358/1.18 |
| 2009/0044169 A1* | 2/2009 | Liu et al. | 717/100 |
| 2009/0077180 A1* | 3/2009 | Flowers | G06F 17/30654 709/206 |
| 2009/0094343 A1* | 4/2009 | Mehrotra et al. | 709/207 |
| 2009/0125598 A1* | 5/2009 | Sun et al. | 709/206 |

* cited by examiner

SYNCHRONIZATION OF QUESTIONS AND ANSWERS IN A COLLABORATIVE MESSAGING ENVIRONMENT

BACKGROUND OF THE INVENTION

Field of the Invention

The present invention relates to the field of collaborative computing and more particularly to instant messaging in a collaborative computing environment.

Description of the Related Art

The recent rapid development of the Internet has led to advanced modes of synchronous, real-time collaboration able to fulfill the real-time communicative requirements of the modern computing participant. Using the Internet or a corporate intranet as a backbone, individuals worldwide can converge in real-time in cyberspace to share ideas, documents and images in a manner not previously possible through conventional telephony and video conferencing.

To facilitate collaboration over the Internet, a substantial collection of synchronous messaging technologies and protocols have been assembled to effectively deliver audio, video and data over the single data communications medium of the Internet. These synchronous messaging technologies include several, real-time human-to-human collaborative environments such as instant messaging and persistent chat rooms. The common messaging space can accommodate a pair of users to a chat, or multiple users to a conference. In some circumstances, the initiation of the chat can be spontaneous upon one user's recognizing the presence and availability of a partner user. In other circumstances, the initiation of the chat can be planned and can even subsist in a calendared event in a calendaring and scheduling system.

Amongst often used collaborative components in a collaborative environment, instant messaging remains of paramount importance. In instant messaging systems, users are provided with instant messaging client software, which allows them to communicate via an instant messaging server with other users. Although instant messaging systems allow users to communicate with each other in real-time, these existing instant messaging systems have several deficiencies with regard to harmonizing instant message communications sometimes, especially preventing ambiguity in questions and answers between different collaborators.

Consider an example of a user who has a number of questions the user wants to discuss with another user via instant messaging. When involved in a chat session, a user may send multiple questions to another user. In such a case, it is easy for one user to reply to one question and type another, while the other user is still answering the first question. As can be appreciated, even though the typical user interface of an instant messaging client displays the messages in chronological order, displaying questions and answers in chronological order may not be helpful since it is fairly easy to overlook multiple questions with their corresponding answers which are usually out of logical order in a single chat window. This can lead to confusion in carrying out an ongoing session as well as difficulty in reading a stored log of the chat transcript.

BRIEF SUMMARY OF THE INVENTION

Embodiments of the present invention address deficiencies of the art in respect to question and answer management, and provide a method, system and computer program product for synchronizing questions and answers in an instant messaging session. In one embodiment of the invention, a method of synchronizing questions and answers in an instant messaging session can be provided. The method can include maintaining an instant messaging session between first and second participants, for instance a customer service representative and a customer, identifying questions and answers in instant messaging text for the instant messaging session, matching each of the answers to a corresponding one of the questions, and displaying the matched questions and answers supplementally to the displaying of the instant messaging text.

In one aspect of the embodiment, displaying the matched questions and answers supplementally to the displaying of the instant messaging text can include displaying the matched questions and answers in a window that is separate from a window displaying of the instant messaging text. In another aspect of the embodiment, matching each of the answers to a corresponding one of the questions can include for each of the questions and the answers, identifying a threshold number of common words in a question and answer in order to determine a match. In yet another aspect of the embodiment, the method further can include removing a matched one of the questions and answers from the supplemental display responsive to a selection of the matched one of the questions and answers. Finally, in even yet another aspect of the embodiment, displaying the matched questions and answers supplementally to the displaying of the instant messaging text can include displaying the matched questions and answers based on chronological order of when the question was first asked.

In another embodiment of the invention, a collaborative computing data processing system can be provided. The system can include an instant messenger configured to maintain an instant messaging session between first and second participants, an agent coupled to the instant messenger; and, instant messenger question and answer synchronization logic. The logic can include program code enabled to display an initial chat transcript of instant messaging content between first and second participants to the instant messaging session, to identify questions and answers in the instant messaging content, to match each of the answers to a corresponding one of the questions, and, to display the matched questions and answers supplementally to the displaying of the chat transcript.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for synchronizing questions and answers in an instant messaging session. In accordance with an embodiment of the present invention, an instant messaging session can be established and maintained as between at least two participants in a collaborative environment. One participant can pose a question to another participant within text in the instant messaging session. Upon posting the posing the question, the question can be displayed supplementally to the displaying of the text. Subsequently, the matching of each of the answers to a corresponding one of the questions can be implemented from within an instant message. Thereafter, the displaying of the matched questions and answers supplementally in a sequence in the displaying of the chat transcript can be provided such that synchronizing questions and answers can ensure that a participant does not overlook a question where response on their part is required.

Figure 1:
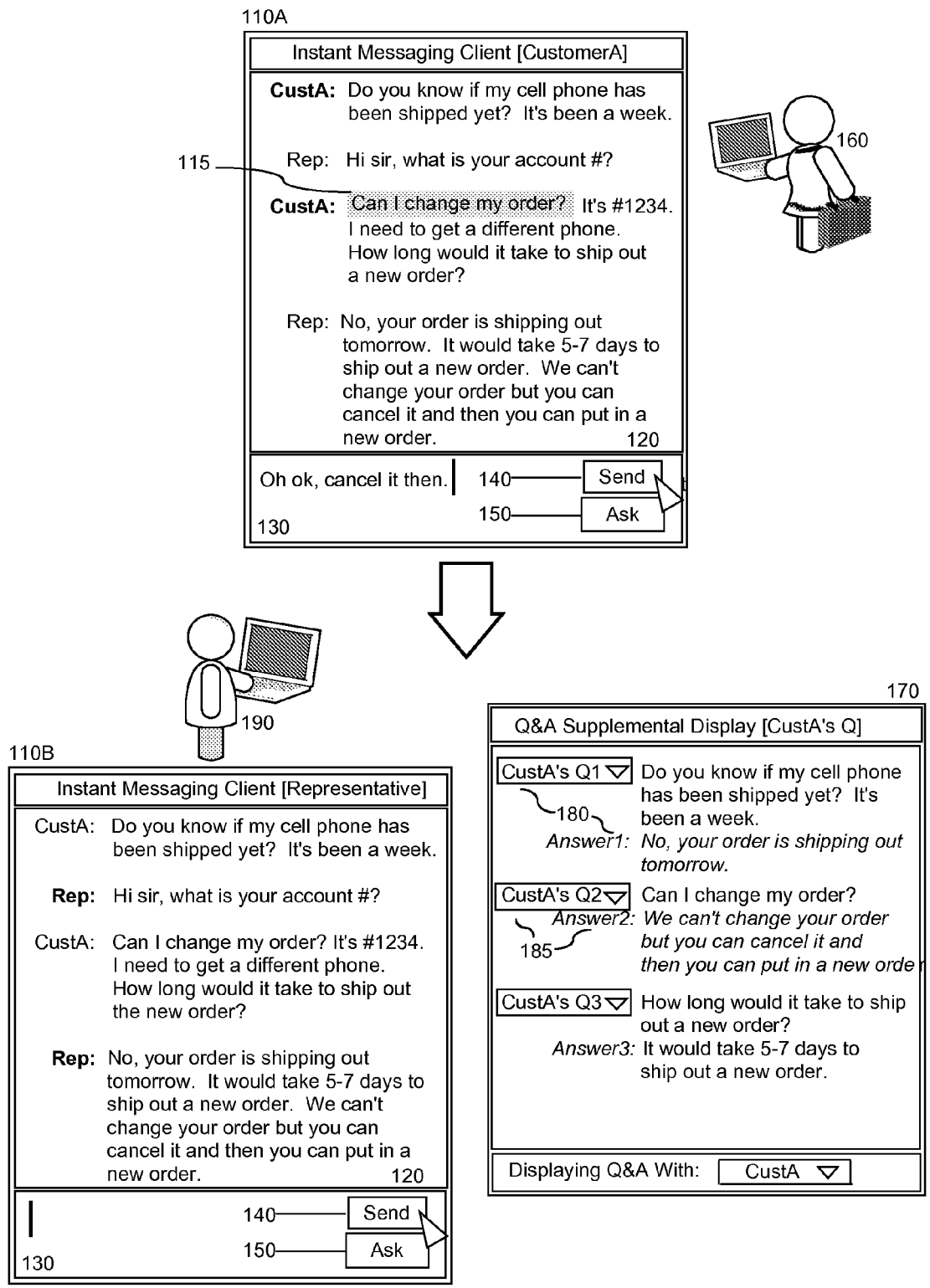
FIG. 1 is a pictorial illustration of an instant messenger configured for question and answer synchronization.

In further illustration, FIG. 1 is a pictorial illustration of an instant messenger configured for synchronizing questions and answers. As shown, an instant messaging client 110A can support an instant messaging session between different participants. The instant messaging session can be represented within instant messaging session text 120. Individual participants to the instant messaging session can provide entries to the instant messaging session text 120 through message entry field 130. Upon selecting a send control 140, content provided in the message entry field 130 can be added to the instant messaging session text 120. Notably, questions and answers can be synchronized from within the instant messaging session text 120.

To initiate synchronization for questions and answers in the instant messaging session text 120, questions and answers can be identified in the instant messaging session text 120 and each of the answers to a corresponding one of the questions can be matched by either manual intervention from the participant or automatic synchronization.

In automatic synchronization, questions and answers can be automatically identified in the instant messaging session text 120 fragment by fragment, and each of the answers to a corresponding one of the questions can be matched. Thereafter, when a fragment is automatically denoted as a question, automatic synchronization logic can augment the instant messaging client 110B with a supplemental display transcript 170. Consequently, the supplemental display transcript 170 can illustrate a reorganized logical sequence of a matching pair of question and its corresponding answer 180.

Alternatively, manual synchronization can be provided. Manual synchronization can include highlighting a fragment 115 within the instant messaging session text 120 and selecting an ask control 150. By manually denoting a fragment as a question which a response is required, the sender participant 160 can ensure that the recipient participant 190 of the question will respond to the fragment. Once identified as a question, the ask control 150 can augment the instant messaging client 110B with a supplemental display transcript 170 and display the pair of matching question and answer 185.

Figure 2:
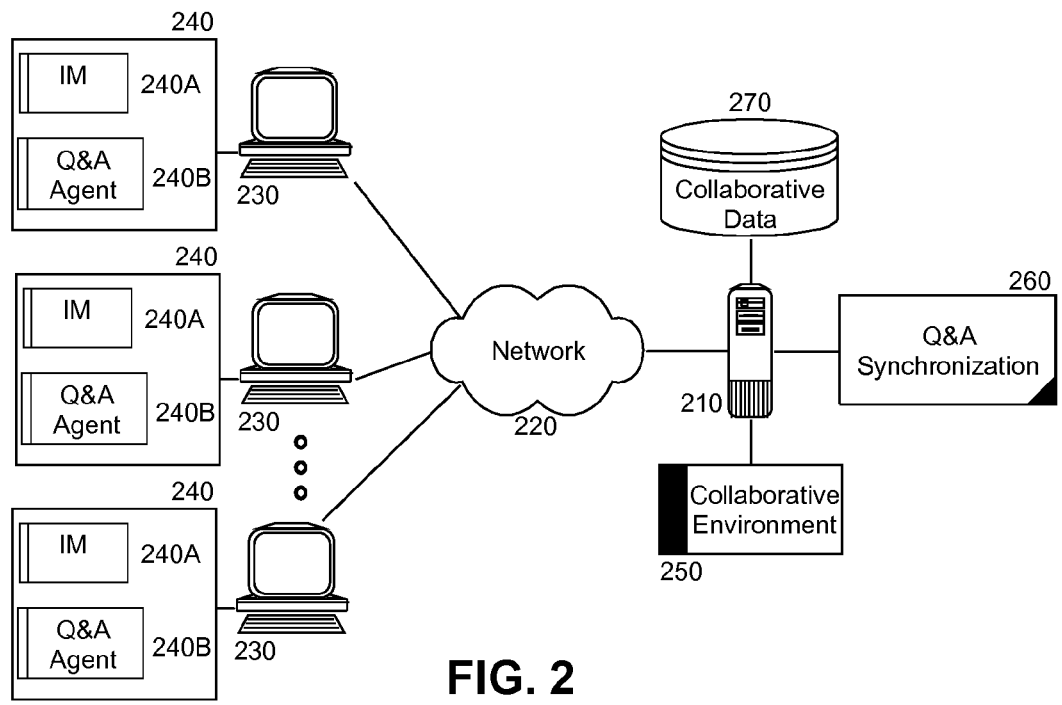
FIG. 2 is a schematic illustration of a collaborative computing data processing system configured for synchronizing questions and answers in an instant messaging session; and, FIG. 3 is a flow chart illustrating a process for synchronizing questions and answers in an instant messaging session.

The synchronization of questions and answers process described herein can be embodied within a collaborative computing environment. In illustration, FIG. 2 is a schematic illustration of a collaborative computing data processing system configured for synchronizing questions and answers in an instant messaging session. The system can include a host server 210 configured for communicative coupling to one or more collaborative clients 230 over computer communications network 220. The host server 210 can support the operation of a collaborative environment 250 serving each of the collaborative clients 230 and managing collaborative data 270 for the collaborative clients 230.

Each of the collaborative clients 230 can provide a collaborative application 240. The collaborative application 240 can include, for example, an instant messenger 240A, and a Q&A agent 240B. It will be recognized by the skilled artisan, however, that any or all of the functional portions of the collaborative application 240 can be disposed in host server 210 as part of the collaborative environment 250 and provided to a lightweight client in collaborative client 230 such as a Web browser over the computer communications network 220.

Notably, instant messaging question and answer synchronization logic 260 can be coupled to the collaborative environment 250 through host server 210. The logic 260 can include program code enabled to allow a participant's question in an instant messaging session to be matched with the corresponding answer made by another participant in an instant messaging session. Further, each matching pair of question and answer can be displayed in a supplemental display transcript. The order of display can based on, for example, chronological order of when the question was first asked, alphabetical order, or order the pairs by certain keywords, like a name or product number.

Figure 3:
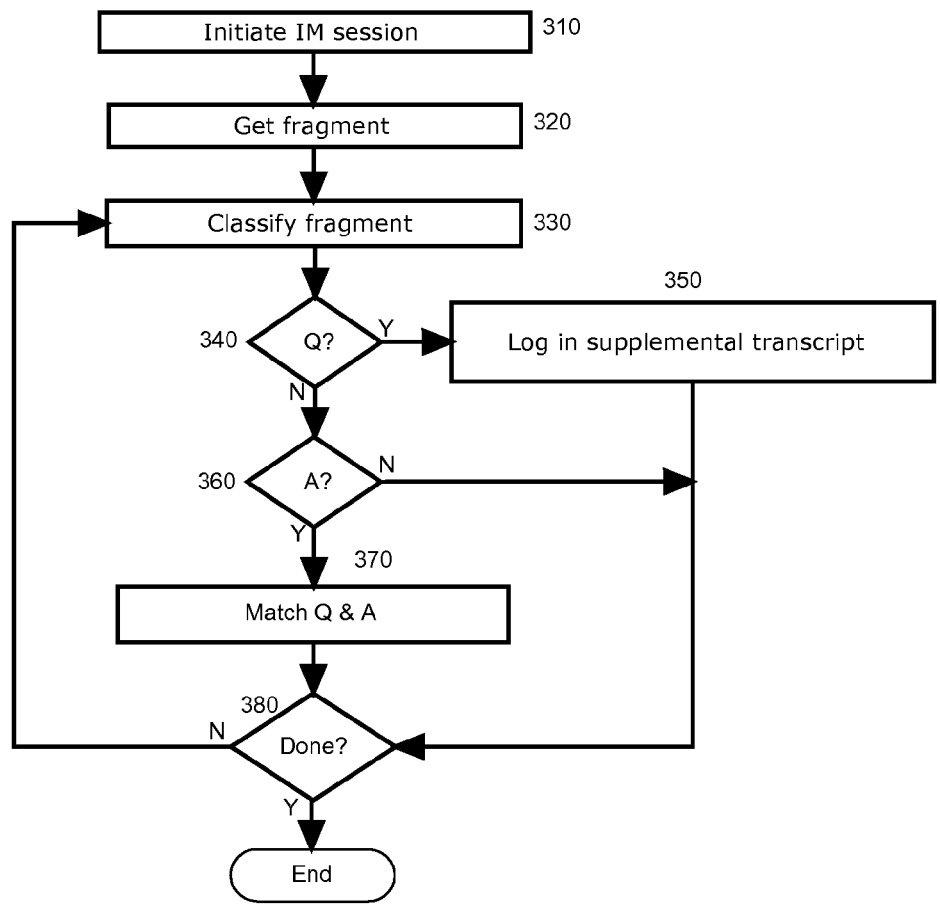

In yet further illustration of the operation of portions of the instant messaging question and answer synchronization logic 260, FIG. 3 is a flow chart illustrating a process for synchronizing questions and answers in an instant messaging session. Beginning in block 310, an instant messaging session can be initialized between at least two participants. In block 320, a fragment within the instant messaging session text can be retrieved. Since an instant message can contain multiple questions or answers, each instant message entry can be parsed into fragments based on, for example, punctuation. Next in block 330, each fragment can be classified into a category. For instance, if the participant wants to manually synchronize the question and answer, then the fragment can be highlighted and the ask control unit can be activated to manually request a reply from the receiver participant. Further each fragment can be given an ID number to identify its category.

In decision block 340, it can be determined whether a fragment is a question towards a designated one of the participants in the instant messaging session. Determination can include accessing the collaborative data which can for example, contain question phrases such as "how", "why", or "do you know" that the Q&A synchronization logic can utilize when determining whether a fragment is a question. Alternatively, the synchronization logic can determine whether a fragment is a question based on punctuation, such as the presence of a question mark "?". Further, the synchronization logic can intelligently guess whether a fragment is a question by certain buzz words, such as "I don't understand" or "I'm having trouble finding." It will be recognized by the skilled artisan, however, that any or all of the functional portions of the Q&A synchronization can be done on the client side also by utilizing the Q&A agent.

If the fragment is a question, then in block 350 each question fragment within the instant messaging text can be aggregated into a single supplemental transcript separately displayed from the initial chat transcript to the participants in their respective instant messaging clients. Further, the Q&A agent can provide a confirmation mechanism, in which any time during the chat session, the participant can click on a displayed question in the supplemental display transcript and allow the participant to remove a specific question from the list of questions displayed.

Next in decision block 360, it can be determined whether a fragment is an answer. The Q&A synchronization logic can identify the answer. Additionally in block 370 the Q&A synchronization logic can be enabled to match an answer to its corresponding question based on common words with a potential question. In addition, in order to confirm the linkage of answer and question, the synchronization logic or Q&A agent can prompt the participant if the matching is correct. In decision block 380, it can be determined when all the questions and answers are done. If a participant attempts to close the chat session before all the questions are answered, a small warning message can be displayed asking the participant if he/she really wants to close the chat session. Additionally, unanswered questions can be highlighted and brought to the attention of the participant. Further, the unanswered questions can be stored locally or on the server for next time the participants engage in a chat session.

Other customization options can include, for example, color-coordinating questions and answers in the supplemental display transcript. Additionally, matched questions and answers can shown with strike-through. Each question and answer can be assigned an matching ID# or metadata. Additionally, in the event that an instant message includes a new question, it can be appended to the original questioner's supplemental transcript list of questions.

Further enhancements can include enabling the Q&A agent or Q&A synchronization logic to have program code for monitoring things other than questions, such as, names, locations, or even finding a contact from the participant's address book or buddy list. For instance, when a participant states "I don't know but I'm sure Bob Jones would know the answer to that." Bob Jones name can be automatically searched in the participant's buddy list or address book and another chat window or email addressed to Bob Jones can be provided to the participant. Additionally, pre-defined possible answers to a certain question could be displayed to the participant and allow the participant to choose a pre-defined answer.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computer-implemented method of maintaining an instant message session between a first participant and a second participant, comprising:

parsing, into a plurality of fragments associated with the first participant, one of a plurality of instant messages received from the first participant within the instant message session;

parsing, into a plurality of fragments associated with the second participant, one of a plurality of instant messages received from the second participant within the instant message session;

identifying one of the plurality of fragments, based upon message text of the plurality of fragments associated with the first participant, as a question;

identifying one of the plurality of fragments, based upon message text of the plurality of fragments associated with the second participant, as an answer;

matching the answer to the question; and providing instructions for displaying, concurrently with and separate from an initial chat transcript, a supplemental display transcript, wherein the initial chat transcript displays, in sequential order, the plurality of instant messages from the first and second participant, the supplemental display transcript displays the answer visually matched to the question, and the matching the answer to the question is based upon a threshold number of common words in the answer and the question.

2. The method of claim 1, wherein
the supplemental display transcripts displays a second question matched to a second answer.

3. The method of claim 1, wherein
the supplemental display transcript displays matched questions and answers based on chronological order of when a respective question was presented in the initial chat transcript.

4. The method of claim 1, wherein
the initial chat transcript is displayed in a first window separate from a second window in which the supplemental display transcript is displayed.

5. The method of claim 1, wherein
a question fragment is identified as being unmatched to a corresponding answer fragment; and
the unmatched question fragment is visually distinguished.

6. A computer hardware system for maintaining an instant message session between a first participant and a second participant, comprising:
at least one hardware processor configured to perform:
parsing, into a plurality of fragments associated with the first participant, one of a plurality of instant messages received from the first participant within the instant message session;
parsing, into a plurality of fragments associated with the second participant, one of a plurality of instant messages received from the second participant within the instant message session;
identifying one of the plurality of fragments, based upon message text of the plurality of fragments associated with the first participant, as a question;
identifying one of the plurality of fragments, based upon message text of the plurality of fragments associated with the second participant, as an answer;
matching the answer to the question; and
providing instructions for displaying, concurrently with and separate from an initial chat transcript, a supplemental display transcript, wherein
the initial chat transcript displays, in sequential order, the plurality of instant messages from the first and second participant,
the supplemental display transcript displays the answer visually matched to the question, and
the matching the answer to the question is based upon a threshold number of common words in the answer and the question.

7. The system of claim 6, wherein
the supplemental display transcripts displays a second question matched to a second answer.

8. The system of claim 6, wherein
the supplemental display transcript displays matched questions and answers based on chronological order of when a respective question was presented in the initial chat transcript.

9. The system of claim 6, wherein
the initial chat transcript is displayed in a first window separate from a second window in which the supplemental display transcript is displayed.

10. The system of claim 6, wherein
a question fragment is identified as being unmatched to a corresponding answer fragment; and
the unmatched question fragment is visually distinguished.

11. A computer program product, comprising
a computer usable storage device having stored therein computer usable program code for maintaining an instant message session between a first participant and a second participant
the computer usable program code, which when executed by a computer hardware system, causes the computer hardware system to perform:
parsing, into a plurality of fragments associated with the first participant, one of a plurality of instant messages received from the first participant within the instant message session;
parsing, into a plurality of fragments associated with the second participant, one of a plurality of instant messages received from the second participant within the instant message session;
identifying one of the plurality of fragments, based upon message text of the plurality of fragments associated with the first participant, as a question;
identifying one of the plurality of fragments, based upon message text of the plurality of fragments associated with the second participant, as an answer;
matching the answer to the question; and
providing instructions for displaying, concurrently with and separate from an initial chat transcript, a supplemental display transcript, wherein
the initial chat transcript displays, in sequential order, the plurality of instant messages from the first and second participant,
the supplemental display transcript displays the answer visually matched to the question,
the computer usable storage device does not consist of a transitory, propagating signal, and the matching the answer to the question is based upon a threshold number of common words in the answer and the question.

12. The computer program product of claim 11, wherein
the supplemental display transcripts displays a second question matched to a second answer.

13. The computer program product of claim 11, wherein
the supplemental display transcript displays matched questions and answers based on chronological order of when a respective question was presented in the initial chat transcript.

14. The computer program product of claim 11, wherein
the initial chat transcript is displayed in a first window separate from a second window in which the supplemental display transcript is displayed.

15. The computer program product of claim 11, wherein
a question fragment is identified as being unmatched to a corresponding answer fragment; and
the unmatched question fragment is visually distinguished.

* * * * *